No Printed Specification Available
PATENTED JAN. 13, 1835.
8591X
T. DITSON.
MACHINE FOR BREAKING THE OUTER HUSKS OF THE COFFEE BERRY.
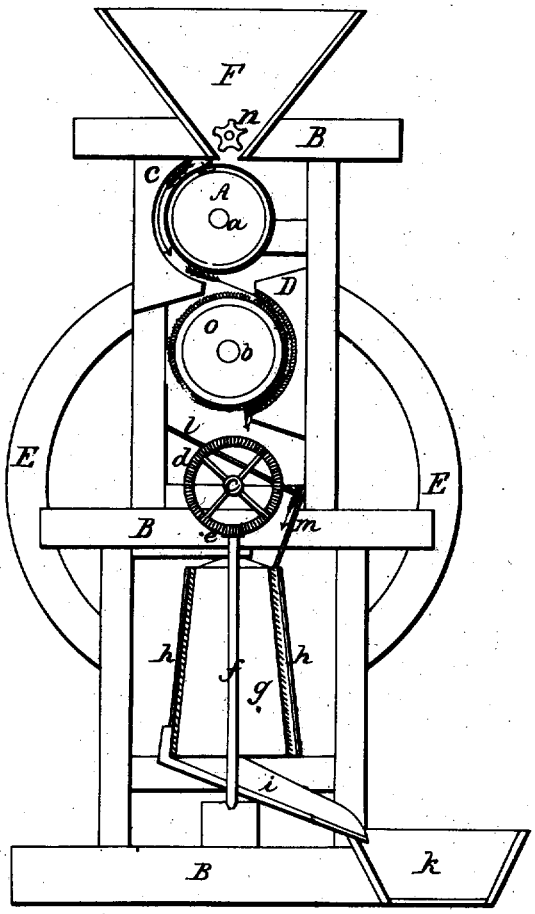

[illegible] 13

8591X Jan. 13. 1835

Thomas Ditson

Machine for breaking or cracking in pieces, the outer husks of the Coffee berry

The schedule referred to in these Letters Patent and making part of the same; containing a discription in the words of the said Thomas Ditson himself, of his improvement in a Machine for breaking or cracking in pieces, the outer husks of the Coffee berry —

To all persons, to whom these Presents shall come, Thomas Ditson of Boston in the county of Suffolk & state of Massachusetts, sends greeting Be it known, that I the said Thomas Ditson, have invented, made and applied to use, new and useful improvements of Machinery for the purpose of seperating the external coats or husks of the Coffeeberry, from the kernels or seed, which improvements, the principles thereof, and mode ~~of~~ in which I have contemplated the application of the same, together with the manner of using the same, I have hereunto sett forth and described in the following words and drawings, which, taken in connection form my specification —

On examination of the Coffeeberry, we find it composed of three external coats or husks, forming two compartments surrounding the seeds — The object of the invention here described, is to crack or break open these husks when in a dry state, that by another process of winnowing they may be blown away or scattered from the seeds — The outer covering is a stouter and stronger texture, than the second both being quite brittle and easily broken in pieces — The third, or covering immediately contiguous to the seed is of a more delicate nature than the others and adheres more closely to the Coffee — The first operation of the machine here described is to crack or crush the outer husk the second also tearing asunder the second covering, while the third and last operation is to rub off, or separate from the seeds, the covering immediately in contact with them —

The machinery for the first purpose, consists of a Cylinder A of wood or other suitable material, surrounded by an external covering X of sheet iron perforated with holes by punches on the under surface

8591X so that jagged edges are raised on the outer surface, similar to a common
grater. The shaft of the cylinder A revolves in proper boxes attached to the
sides of the frame BB, which boxes admit of being moved laterally so as
to carry the cylinder farther from, or nearer to a concave surface C, covered
with sheet iron similar to the cylinder A - on the end of the shaft a
of the Cylinder A is fixed a cogged wheel, whose teeth enter into, and
act upon the teeth of another cogged wheel on the shaft b. The last
mentioned shaft b passes through a second wooden or iron cylinder
O covered with stout wires inserted in leather of the same description
used for carding wool -

A concave surface D. covered like the cylinder O, passes a proper
distance around the same, and with sufficient space between the points
of the Cards of each to effect the purpose of tearing off the second
husk of the seed as it drops from the first Cylinder A and passes
between the card surfaces —

The cogged wheel on the end of the shaft b is turned round by an-
other cogged wheel on the extremity of another horizontal shaft c - The shaft
c has a bevelled wheel d on its other end, the teeth of which enter into
the teeth of a bevelled pinion e. on the top of the upright shaft f - The
upright shaft f passes through the conic frustrum g. into which nails
are thickly driven, so as to stand out from the convex surface about
seven eighths of an inch - Around the whole frustrum, is another
hollow frustrum h of sheet iron, filled with holes similar to that around
the cylinder A - The rough edges of the iron thus raised by the punches
together with the ends of the nails coming in contact with the seeds during
the rotary motion of the conic frustrum, tear off the third and last
covering, thus effectually separating the husks from the seeds and
leaving the whole in a proper state for the next process of winnow-
ing — The broken husks and seeds as they leave from between
the surfaces of the inner and outer conic frustra fall into a trough
I placed underneath, from whence they are conveyed to a proper
receptacle K on the outer extremity of the axis of the shaft C is fixed
a fly wheel E to regulate the motion of the machinery - The power to set the machine in operation may be communicated to the shaft c. by a crank on its end, or a pulley or pulleys operated on by a belt from a drum driven by steam, horse or water power; as is most convenient. There is also on the horizontal shaft c a set of small pulleys of three or more of different diameters, on to each of which a shifting belt may be placed; the belt from thence passing over an opposite pulley of another, set on the end of a horizontal shaft c having a fluted roller n fixed on it, at the mouth of the hopper E for the purpose of regulating the admission of the berries to the space between the Cylinders and preventing them from clogging together; thereby stopping the feed of the machine.

Inclined planes L M serve to guide or convey the berries from each cylinder to the one below it, and the passage or course of the same from the hopper F. to the receptacle K is clearly denoted by several arrows seen in the drawing.

I claim separating the seeds or kernels from the husks by the several operations and machinery herein above described in connection; and separately I claim the invention and use of a cylinder covered with sheet iron having holes punched in it, as herein above mentioned, for bruising or breaking in pieces the outer shell or covering of the Coffee berry. Also the invention and use of a cylinder or frustrum of a cone, into whose outer surface nails are inserted & which is surrounded by an exterior casing of sheet iron, punched full of holes so that jagged edges shall be raised on the inner surface for the purpose of scratching or rubbing off the inner husk of the Coffee berry.

In testimony that the above is a true specification of my invention, I have hereunto set my hand this twelfth Day of December in the year of our Lord Eighteen Hundred and Thirty four.

Witnesses
Robt. H. Eddy
Wm. C. Darracott

Thomas Ditson

235 [illegible]

(Drawing)

[illegible]